Patented May 24, 1949

2,470,903

UNITED STATES PATENT OFFICE 2,470,903

MANUFACTURE OF DERIVATIVES OF ETIOCHOLENIC ACID

Walter Charles Joseph Ross, London, England

No Drawing. Application February 13, 1946, Serial No. 647,437. In Great Britain February 21, 1945

7 Claims. (Cl. 260—397.1)

The present invention relates to the preparation of etiocholenic acid derivatives from pregnene derivatives having a keto group in the 20-position and which may also contain in the nucleus more than the one double bond and also one or more of the following groups: O-acyl, O-alkyl, O-aralkyl or halogen; for example the preparation from $\Delta^5$-pregnen-3-ol-20-one of 3-acetoxy-$\Delta^5$-etiocholenic acid which is used in the preparation of deoxycorticosterone acetate. The present invention also includes the products produced by this method.

It is known that $\Delta^5$-pregnen-3-ol-20-one can be converted to 3-hydroxy-$\Delta^5$-etiocholenic acid by condensing pregnenolone acetate with benzaldehyde and oxidising the resulting condensation product with chromic acid after protecting the double bond by addition of bromine (Marker et al., Journ. Am. Chem. Soc., 1942, 1282).

The present invention aims at providing a method for preparing derivatives of etiocholenic acid in which the necessity for protecting the double bond is avoided and it comprises a method for preparing such derivatives in which a condensation product of a pregnene derivative (as above defined) with an aldehyde is oxidised in a neutral organic solvent in which the oxidising agent is soluble without reaction.

Thus the acetate of the condensation product of pregnenolone with an aldehyde, for example furfuraldehyde or benzaldehyde can be oxidised in acetone solution with potassium permanganate directly to 3-acetoxy-$\Delta^5$-etiocholenic acid without protecting the double bond, in yields of over 50% based on the original pregnenolone.

The ring system of the condensation product may contain more than the one double bond and also one or more of the following constituents in the nucleus: O-acyl, O-alkyl, O-aralkyl or halogen, when these were present in the starting substance. The oxidation can be effected either at room temperature or at an elevated temperature, for example on a boiling water bath. In the former case the time required to complete the reaction is longer than in the latter.

The following examples are given by way of illustration but are not intended to limit the reaction to the particular derivatives described.

A starting product was made for Examples I, II and III below by dissolving 2.66 gm. of $\Delta^5$-pregnen-3-ol-20-one with warming in 70 cc. of ethyl alcohol and the solution cooled; then a solution of 1.5 gm. of sodium in 45 cc. of ethyl alcohol was added and this was followed by the addition of 1.7 cc. of freshly distilled furfural. The mixture was well shaken and left to stand at room temperature for 24 hours, 100 cc. of water was then added when the condensation product separated as flattened needles, M. P. 110–112° C. Yield 2.2 gm. This material was acetylated by being refluxed with 10 cc. of acetic anhydride and 1 gm. of sodium acetate for ½ hour, cooled and diluted with water, when the acetate (2.4 gm.) crystallised out. This compound had a M. P. of 156–157° C.

Example I 0.1 gm. of the acetate of the furfurylidene compound was dissolved in 10 cc. of acetone and a solution of 0.2 gm. of potassium permanganate in 20 cc. of acetone was added and the solution heated on a boiling water bath for 5–10 minutes and allowed to stand for a further 10 minutes. Water was added and sulphur dioxide passed through the solution to remove manganese dioxide and the product extracted with ether and shaken with sodium hydroxide solution, when a copious precipitate of the sparingly soluble sodium salt of acetoxyetiocholenic acid was formed. After removal of the ether the sodium salt was acidified when the acetoxyetiocholenic acid was obtained M. P. 230° C.

Example II 0.5 gm. of the acetate of the furfurylidene compound was dissolved in 30 cc. of acetone and 1 gm. of powdered potassium permanganate was added during 5 minutes to the warm solution. Water was then added and the mixture boiled for a short time, after which sulphur dioxide was passed through the solution to remove manganese dioxide. After purification through the sodium salt, as in Example I the acetoxyetiocholenic acid had M. P. 232–238° C. Yield 0.3 gm.

Example III 1.6 gm. of potassium permanganate was dissolved in 50 cc. of acetone and 0.8 gm. of the acetate of the furfurylidene compound was washed into the solution with 25 cc. of acetone. The mixture was left to stand in a warm room for 1 hour, when the supernatant liquid was colourless. Water was then added and sulphur dioxide passed through to remove the manganese dioxide. After purification the acetoxyetiocholenic acid had M. P. 232° C.

The invention is not restricted to the use of the above furfuraldehyde condensation product as the starting product; the following example illustrates the use of alternative starting materials. For use in this example, 2.0 gm. of pregnenolone dissolved in 45 cc. of alcohol containing 1 cc. of benzaldehyde was added to a solution of 1.1 gm. of sodium in 33 cc. of alcohol. The mixture was then left for 2 days at room temperature; on dilution with water a solid was precipitated; this was collected and dried and then heated for ½ hour with 10 cc. of acetic anhydride and 1 gm. of sodium acetate. The mixture was diluted with water and the acetate of the benzylidene compound which separated was recrystallised from alcohol. It had M. P. 179–183° C. Yield 2 gm.

*Example IV*

1 gm. of powdered potassium permanganate was added over a period of 5 minutes, to a solution of 500 mgms. of the acetate of the benzylidene compound in 20 cc. of acetone. The temperature rose from 25 to 35° during the addition. The mixture was then heated at 55° for 5 minutes and then 20 cc. of water was added and the whole was boiled for 10 mins. Sulphur dioxide gas was passed into the cooled solution until decolourisation was complete. Water was added and the mixture was extracted with ether. The acid product was extracted from the ethereal layer with 5% alkali. The aqueous layer was acidified and again extracted with ether. The extract was washed, dried and evaporated and the residue dissolved in hot alcohol. On adding water to the hot solution small plates of the acetoxyetiocholenic acid derivative were deposited. Yield of the acid, M. P. 233–236° C. (not depressed by an authentic specimen) was 250 mgm.

The invention is not limited to the use of potassium permanganate in acetone solution. Other neutral organic solvents in which the condensation product is soluble and in which the oxidising agent is also soluble without reaction, can be used. Such solvents are for example dioxane or simple ketones such as methyl ethyl ketone.

I claim:

1. A method of preparing a derivative of etiocholenic acid which consists in condensing with an aldehyde a pregnene derivative having a keto group in the 20-position and a hydroxy group in the 3-position, acetylating the condensation product to convert said hydroxy group into an acetoxy group, and oxidizing the acetate of the condensation product by means of potassium permanganate in an organic solvent selected from the class consisting of dioxane and simple ketones without protecting the double bond.

2. A method of preparing a derivative of etiocholenic acid which consists in condensing with an aldehyde a pregnene derivative having a keto group in the 20-position and a hydroxy group in the 3-position, acetylating the condensation product to convert said hydroxy group into an acetoxy group, and oxidizing the acetate of the condensation product by means of potassium permanganate in acetone solution without protecting the double bond.

3. A method of preparing a derivative of etiocholenic acid which consists in condensing with a benzaldehyde a pregnene derivative having a keto group in the 20-position and a hydroxy group in the 3-position, acetylating the condensation product to convert said hydroxy group into an acetoxy group, and oxidizing the acetate of the condensation product by means of potassium permanganate in acetone solution without protecting the double bond.

4. A method of preparing a derivative of etiocholenic acid which consists in condensing with furfuraldehyde a pregnene derivative having a keto group in the 20-position and a hydroxy group in the 3-position, acetylating the condensation product to convert said hydroxy group into an acetoxy group, and oxidizing the acetate of the condensation product by means of potassium permanganate in acetone solution without protecting the double bond.

5. A method of preparing a derivative of etiocholenic acid which consists in condensing with an aldehyde a pregnene derivative having a keto group in the 20-position and a hydroxy group in the 3-position, acetylating the condensation product to convert said hydroxy group into an acetoxy group, and oxidizing the acetate of the condensation product with potassium permanganate in a neutral organic solvent selected from the class consisting of dioxane and simple ketones in which the permanganate and the product itself are both soluble without reaction and without protecting the double bond.

6. A method of preparing acetoxyetiocholenic 3-acid comprising condensing $\Delta^5$-pregnen-3-ol-20-one with benzaldehyde, acetylating at the 3-position, and oxidising the product with an acetone solution of potassium permanganate without protecting the double bond.

7. A method of preparing acetoxyetiocholenic 3-acid comprising condensing $\Delta^5$-pregnen-3-ol-20-one with furfuraldehyde, acetylating at the 3-position, and oxidising the product with an acetone solution of potassium permanganate without protecting the double bond.

WALTER CHARLES JOSEPH ROSS.

REFERENCES CITED

The following references are of record in the file of this patent:

UNITED STATES PATENTS

| Number | Name | Date |
|---|---|---|
| 2,297,580 | Oppenauer | Sept. 29, 1942 |
| 2,376,708 | Marker | May 22, 1945 |

OTHER REFERENCES

Marker, Jour. Am. Chem. Soc., 64, 1842–1843 (1942).